United States Patent
Xu et al.

(10) Patent No.: US 12,228,529 B1
(45) Date of Patent: Feb. 18, 2025

(54) **NON-DESTRUCTIVE DETECTION METHOD AND SYSTEM FOR *CONOPOMORPHA SINENSIS* BRADLEY**

(71) Applicant: Institute of Facility Agriculture, Guangdong Academy of Agricultural Sciences, Guangdong (CN)

(72) Inventors: Sai Xu, Guangdong (CN); Huazhong Lu, Guangdong (CN); Xin Liang, Guangdong (CN)

(*) Notice: Subject to any disclaimer, the term of this patent is extended or adjusted under 35 U.S.C. 154(b) by 0 days.

(21) Appl. No.: 18/764,273

(22) Filed: Jul. 4, 2024

(30) Foreign Application Priority Data

Aug. 18, 2023 (CN) .......................... 202311041730.1

(51) Int. Cl.
*G01N 23/083* (2018.01)
*G01N 23/04* (2018.01)

(52) U.S. Cl.
CPC ........... *G01N 23/083* (2013.01); *G01N 23/04* (2013.01); *G01N 2223/1016* (2013.01)

(58) Field of Classification Search
CPC ............... G01N 21/25; G01N 21/3563; G01N 21/359; G01N 23/04; G01N 23/083; G01N 9/24; G01N 9/36; G06V 10/764; G06V 10/774; G06V 10/806
See application file for complete search history.

(56) References Cited

U.S. PATENT DOCUMENTS

2022/0222798 A1\* 7/2022 Panigrahi .............. G06T 7/0004

FOREIGN PATENT DOCUMENTS

| CN | 1940555 A | 4/2007 |
|---|---|---|
| CN | 103808669 A | 5/2014 |
| CN | 103954570 A | 7/2014 |
| CN | 104155312 A | 11/2014 |
| CN | 105044024 A | 11/2015 |
| CN | 109470639 A | 3/2019 |
| CN | 109557090 A | 4/2019 |
| CN | 109738442 A | 5/2019 |

(Continued)

OTHER PUBLICATIONS

1st Office Action of counterpart Chinese Patent Application No. 202311041730.1 issued on Jan. 10, 2024.
Notice of Allowance of counterpart Chinese Patent Application No. 202311041730.1 issued on Apr. 12, 2024.

(Continued)

*Primary Examiner* — Courtney D Thomas

(57) ABSTRACT

The present disclosure discloses a non-destructive detection method and system for *Conopomorpha sinensis* Bradley, which includes: placing a lychee sample to be detected on a conveyor belt; acquiring sample information of the lychee sample based on visible/near-infrared light and X-ray imaging technology; wherein the visible/near-infrared light acquires internal quality features of the lychee sample; the X-ray imaging technology acquires internal density variation features of the lychee sample; analyzing the sample information according to a preset data processing and analysis method based on PLSR and a support vector machine to obtain a classification result of the lychee sample. The present disclosure uses the visible/near-infrared transmission spectrum and the X-ray imaging feature fusion in combination with PLSR to improve the detection accuracy of the lychee sample of the testing set to 92.92%, and in combination with the support vector regression to obtain a classification accuracy of 94.44% of the testing set.

3 Claims, 11 Drawing Sheets

(56) References Cited

FOREIGN PATENT DOCUMENTS

| | | | |
|---|---|---|---|
| CN | 111008970 A | 4/2020 | |
| CN | 112016392 A | 12/2020 | |
| CN | 112986174 A | 6/2021 | |
| CN | 113049530 A | 6/2021 | |
| CN | 113484278 A | 10/2021 | |
| CN | 113533236 A | 10/2021 | |
| CN | 114527082 A | 5/2022 | |
| CN | 114882249 A | 8/2022 | |
| CN | 116008225 A | 4/2023 | |

OTHER PUBLICATIONS

Hanping Mao et al., Research Progress and Prospect for Image Recognition of Stored-grain Pests, Journal of Agricultural Machinery, Apr. 2008, pp. 175-179 and p. 186, vol. 39, Issue 4.

Ping Han et al., Application of X-ray Nondestructive Determination Technologies on Quality Evaluation of Agriculture Products, Agricultural Mechanization Research, Oct. 2009, pp. 6-10, vol. 10.

Dayang Liu et al., Identification of Kiwifruits Treated with Exogenous Plant Growth Regulator Using Near-Infrared Hyperspectral Reflectance Imaging, Food Analytical Methods, May 7, 2014.

Hongguang Chen et al., Noninvasive Detection Using Diffuse Reflectance Spectrum for Monitoring Jujube Interior Pest Based on Support Vector Machine, Journal of Northeast Agricultural University, Feb. 2014, pp. 94-102, vol. 45, Issue 2.

Linzhong Zhang et al., Application of NIR Spectroscopy for nondestructive Qualitative and Quantitative Analysis of Table Grapes Berries, Acta Agriculturae Zhejiangensis, 2018, pp. 330-338, vol. 30, Issue 2.

Yaqi Shen et al., R esearch Progress of Hyperspectral Image Technology in Fruit Nondestructive Testing, Forestry Machinery & Woodworking Equipment, Mar. 2021, pp. 4-9, vol. 49, Issue 3.

* cited by examiner

NON-DESTRUCTIVE DETECTION METHOD AND SYSTEM FOR *CONOPOMORPHA SINENSIS* BRADLEY

CROSS-REFERENCE TO RELATED APPLICATIONS

The present disclosure claims the priority of Chinese Patent Application No. 202311041730.1, filed on Aug. 18, 2023, the entire contents of which are hereby incorporated by reference.

FIELD

The present disclosure relates to the field of lychee fruit detection technology, and more particularly, to a non-destructive detection method and system for *Conopomorpha sinensis* Bradley.

BACKGROUND

Lychee is a tropical and subtropical fruit with rich nutrition, delicious taste and high medicinal value. China is the main lychee production country, with a production area of lychee being 476,000 hm², accounting for 66.9% of the global lychee production area, with a production of lychee being about 2.017 million tons, accounting for 60.8% of the global lychee production, ranking first in the world. *Conopomorpha sinensis* Bradley, which belongs to the order Lepidoptera and the family Meloidae, is the first pest in lychee production. The larvae of *Conopomorpha sinensis* Bradley mainly damages lychee fruits, flower spikes, tender shoots and tender leaves. Young lychee fruits are most severely damaged by *Conopomorpha sinensis* Bradley, with a fruit-infested rate being over 95% in severely-affected lychee orchards. Although the prevention and control methods of *Conopomorpha sinensis* Bradley gradually mature and improve, it is still impossible to avoid some lychee fruits being damaged by *Conopomorpha sinensis* Bradley, which is one of the reasons affecting the lychee quality and limiting lychee export volume.

To solve the above problem, those skilled in the art have developed a non-destructive, intelligent and rapid detection method for *Conopomorpha sinensis* Bradley.

SUMMARY

In order to solve the above technical problems, the present disclosure provides a non-destructive detection method and system for *Conopomorpha sinensis* Bradley.

The non-destructive detection method for *Conopomorpha sinensis* Bradley provided in the present disclosure includes the following steps:
  placing a lychee sample to be detected on a conveyor belt;
  acquiring sample information of the lychee sample placed on the conveyor belt based on visible/near-infrared light and X-ray imaging technology; wherein the visible/near-infrared light is used to acquire internal quality features of the lychee sample and the X-ray imaging technology is used to acquire internal density variation features of the lychee sample; and
  analyzing the sample information according to a preset data processing and analysis method based on PLSR and a support vector machine to obtain a classification result of the lychee sample with and without insects.

In some embodiments, the data processing and analysis method based on PLSR and the support vector machine is as follows:
  selecting effective wavelengths from full spectrum and fusing the selected effective wavelengths using a continuous projection method;
  preliminarily determining a classification of the lychee sample with and without insects using PCA, which is represented by a sample scatter plot formed by a first principle component and a second principal component; and
  dividing spectral data after feature extraction into a training set and a testing set and establishing a discrimination model using PLSR, wherein a detection result of the lychee sample without insects is set to be 0 and the detection result of the lychee sample with insects is set to 1, a detection effect of a PLSR model is greatly affected by a number of the selected features after dimensional reduction, and the detection result is outputted as a decimal number, which is usually represented by a coefficient of determination $R^2$ between a predicted value and an actual value, as well as a root mean square error.

In some embodiments, the non-destructive detection method further includes:
  dividing a training set and a testing set and establishing a prediction model using SVR, wherein a prediction result of the lychee sample without insects is set to be 0 and the prediction result of the lychee sample with insects is set to be 1, and rounding results of the PLSR model and a SVR model to a nearest integer, wherein when the integer is less than or equal to 0, it indicates the lychee sample does not have insects; when the integer is greater than or equal to 1, it indicates the lychee sample has insects.

In some embodiments, the selecting effective wavelengths from full spectrum and fusing the selected effective wavelengths using a continuous projection method includes:
  extracting average grayscale values of a stem, a core, and a flesh in a X-ray transmission image of the lychee sample with the best classification and prediction effect, and combining the average grayscale values with feature bands of visible/near-infrared transmission spectrum extracted using the continuous projection method to form a comprehensive analysis of multi-source information.

In some embodiments, a low-density material tray is arranged on the conveyor belt for loading the lychee sample to be detected.

The present disclosure further provides a non-destructive detection system for *Conopomorpha sinensis* Bradley, including a visible/near-infrared non-destructive detection platform, an X-ray imaging detection platform, a power supply platform, a conveyor device, and an information processing device;
  wherein the visible/near-infrared non-destructive detection platform is used to acquire internal quality features of the lychee sample;
  the X-ray imaging detection platform is used to acquire internal density variation features of the lychee sample;
  the power supply platform is used to supply power to all devices and platforms in the non-destructive detection system;
  the information processing device is used to perform data processing and analysis based on PLSR and a support vector machine on feature information acquired in the non-destructive detection system to acquire a detection result of the lychee sample with and without insects;

the conveyor device is compatible with the visible/near-infrared non-destructive detection platform and the X-ray imaging detection platform, and is used to convey the lychee sample to be detected to a preset detection platform for detection.

In some embodiments, the information processing device implements feature fusion process on a received quality image representing the internal quality features of the lychee sample and a density variation image representing the internal density variation features of the lychee sample based on a carried data analysis and processing program, and further improves a detection accuracy in combination with PLSR and a support vector regression;

In some embodiments, the feature fusion process on the received quality image representing the internal quality features of the lychee sample and the density variation image representing the internal density variation features of the lychee sample includes the following steps:

extracting average grayscale values of a stem, a core, and flesh in the density variation image of the lychee sample with the best classification and prediction effect, and combining the average grayscale values with feature bands of visible/near-infrared transmission spectrum extracted using the continuous projection method to form a comprehensive analysis of multi-source information;

In some embodiments, the improves the detection accuracy in combination with PLSR includes:

preliminarily determining a classification of the lychee sample with and without insects using PCA, which is represented by a sample scatter plot formed by a first principal component and a second principal component;

dividing spectral data after feature extraction into a training set and a testing set and establishing a discrimination model using PLSR, wherein a detection result of the lychee sample without insects is set to be 0 and the detection result of the lychee sample with insects is set to 1, a detection effect of a PLSR model is greatly affected by a number of the selected features after dimensional reduction, and the detection result is outputted as a decimal number, which is usually represented by a coefficient of determination $R^2$ between a predicted value and an actual value, as well as a root mean square error;

In some embodiments, the improves the detection accuracy in combination with the support vector regression includes:

dividing a training set and a testing set and establishing a prediction model using SVR, wherein a prediction result of the lychee sample without insects is set to be 0 and the prediction result of the lychee sample with insects is set to be 1, and rounding the results of the PLSR model and a SVR model to a nearest integer, wherein when the integer is less than or equal to 0, it indicates the lychee sample does not have insects; when the integer is greater than or equal to 1, it indicates the lychee sample has insects.

It can be seen from the above technical solutions that compared with the prior art, the present disclosure uses the fusion of the visible/near-infrared transmission spectrum and the X-ray imaging feature in combination with PLSR to improve the detection accuracy of the testing set of the lychee sample with and without insects to be 92.92%, and in combination with the support vector regression to improve the accuracy of the classification model of the testing set to be 94.44%.

BRIEF DESCRIPTION OF THE DRAWINGS

To describe the technical solutions in the embodiments of the present disclosure more clearly, the following briefly introduces the accompanying drawings required for describing the embodiments or the prior art. Apparently, the accompanying drawings in the following description show merely some embodiments of the present disclosure, and persons of ordinary skill in the art may still derive other drawings from these accompanying drawings without creative efforts.

DETAILED DESCRIPTION

In order to make the objectives, features, and advantages of the present disclosure more obvious and understandable, the technical solutions in the embodiments of the present disclosure will be clearly and completely described below in conjunction with the accompanying drawings of the embodiments of the present disclosure. It is apparent that the embodiments described below are only a part of the embodiments of the present disclosure, not all of them. Based on the embodiments of the present disclosure, all other embodiments obtained by those skilled in the art without creative effort fall within the scope of protection of the present disclosure.

Stems and cores of rip lychee fruits are main damage sites caused by *Conopomorpha sinensis* Bradley, and *Conopomorpha sinensis* Bradley also affects flesh and peel of the lychee fruits. Insect bites and feces are left behind on the stem of the lychee fruit infested by *Conopomorpha sinensis* Bradley, and cavities may show in the cores of some lychee fruits due to the feeding of *Conopomorpha sinensis* Bradley. Currently, visible/near-infrared spectrum, hyperspectral imaging technology, X-ray imaging technology, and machine vision technology play an important role in the quality detection of agricultural products. Visible/near-infrared light can penetrate external features of agricultural products and acquire internal quality features information, thus, the visible/near-infrared light is suitable for non-destructive detection of the internal conditions of the lychee fruit. The larvae of *Conopomorpha sinensis* Bradley leaves the lychee fruit near the stem of the infested lychee fruit before the cocooning stage, leaving traces near the stem which show the larvae leaving the lychee fruit from the inside of the lychee fruit. The hyperspectral imaging technology can acquire features of an epidermis and a light-transmitting surface near the stem of the lychee fruit. The X-ray imaging technology can penetrate the lychee fruit to acquire internal features of the lychee fruit. After *Conopomorpha sinensis* Bradley infests the lychee fruit, the feces and cavities left behind on the stem and the core cause a decrease in density of the infested part, allowing the X-ray imaging technology to acquire density variation features inside the lychee fruit.

Embodiment 1

Figure 11:
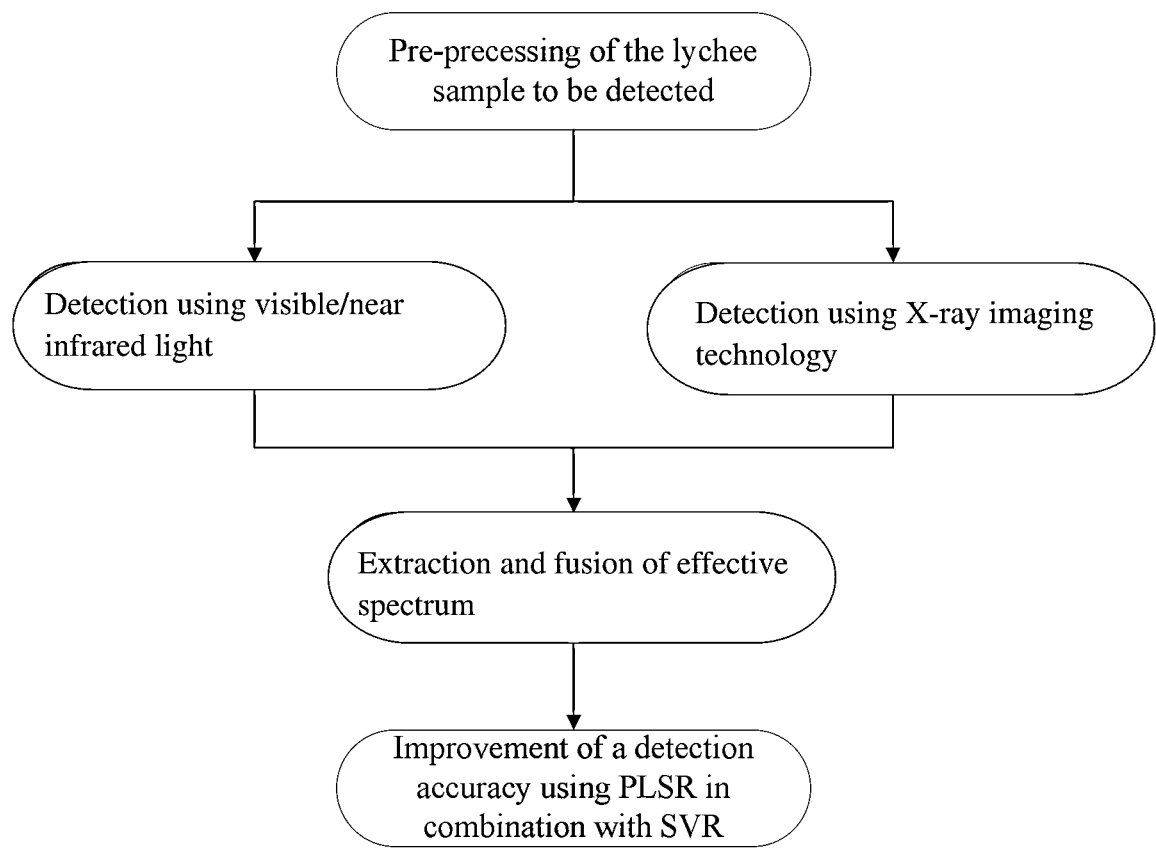
FIG. 11 is a flowchart of a non-destructive detection method in accordance with an embodiment of the present disclosure.

As shown in FIG. 11, the present disclosure discloses a non-destructive detection method for *Conopomorpha sinensis* Bradley, which includes steps as follows.

Placing a lychee sample to be detected on a conveyor belt.

Acquiring sample information of the lychee sample to be detected placed on the conveyor belt based on visible/near-infrared light and X-ray imaging technology, wherein the visible/near-infrared light is used to obtain internal quality features of the lychee sample, and the X-ray imaging technology is used to obtain internal density variation features of the lychee sample.

Analyzing the sample information according to a preset data processing and analysis method based on PLSR and a support vector machine, and obtaining a classification result of the lychee sample with and without insects.

In some embodiments, a low-density material tray is arranged on the conveyor belt for holding the lychee sample to be detected.

The data processing and analysis method based on PLSR and the support vector machine is as follows: selecting effective wavelengths from full spectrum using a continuous projection method and fusing the selected effective wavelengths; preliminarily determining a classification of the lychee sample with and without insects using PCA, which is represented by a lychee sample scatter plot formed by a first principal component and a second principal component; dividing spectral data after feature extraction into a training set and a testing set and establishing a discrimination model using PLSR, wherein a detection result of the lychee sample without insects is set to be 0 and the detection result of the lychee sample with insects is set to 1, a detection effect of a PLSR model is greatly affected by a number of the selected features after dimensional reduction, and the detection result is outputted as a decimal number, which is usually represented by a coefficient of determination $R^2$ between a predicted value and an actual value, as well as a root mean square error (RMSE).

It should be noted that the use of a full-band spectral model can lead to overfitting or excessive noise interference in the analysis results due to information redundancy, resulting in complex models that are not suitable for practical applications. Therefore, selecting effective wavelengths from the full spectrum and finding bands carrying important information to establish a simplified model are more practical. Therefore, in this embodiment, the continuous projection method is used to select effective wavelengths from the full spectrum.

Furthermore, the data processing and analysis method based on PLSR and the support vector machine also includes steps as follows.

Dividing a training set and a testing set and establishing a prediction model using SVR, wherein a prediction result of the lychee sample without insects is set to be 0 and the prediction result of the lychee sample with insects is set to be 1, and rounding results of the PLSR model and a SVR model to a nearest integer, wherein when the integer is less than or equal to 0, it indicates the lychee sample does not have insects; when the integer is greater than or equal to 1, it indicates the lychee sample has insects. It should be noted that the support vector machine is proposed for binary classification problems. Since this embodiment studies how to discriminate the lychee sample with insects and the lychee sample without insects, which is a binary classification problem, and SVR is an application branch of SVM, SVR is used to divide the training set and the testing set and establish the prediction model to further improve the accuracy of the prediction model in this embodiment.

The selecting effective wavelengths from the full spectrum using a continuous projection method and fusing the selected effective wavelengths includes steps as follows.

Extracting average grayscale values of the stem, the core, and the flesh in a X-ray transmission image of the lychee sample with the best classification and prediction, and combining the average grayscale values with feature bands of visible/near-infrared transmission spectrum extracted using the continuous projection method to form a comprehensive analysis of multi-source information.

In this embodiment, when the non-destructive detection for *Conopomorpha sinensis* Bradley is performed on the lychee sample, it is found that the detection effect of the detection method using the visible/near-infrared transmission spectrum is better than the detection effect of the detection method using the hyperspectral imaging technology when the lychee fruit has a smaller size and a good light transmission. However, the single visible/near-infrared transmission spectrum mainly detects changes in the composition and texture of the flesh and other tissues, and cannot cover all the effects of the damages caused by *Conopomorpha sinensis* Bradley. Therefore, it is necessary to introduce the X-ray imaging technology which can detect density combined with the corresponding established model to determine a discrimination effect.

Therefore, the visible/near-infrared transmission technology, the hyperspectral imaging technology, and the X-ray imaging technology are used in this embodiment to obtain feature data from the flesh, the stem and the core, and the epidermis of the lychee fruit respectively, to obtain a more accurate non-destructive detection model for discriminating the lychee sample with insects and the lychee sample without insects. The analysis shows that the visible/near-infrared transmission technology and the X-ray imaging technology have the best detection effect on the lychee fruit, thus, the two detection methods are fused to obtain the data that has the greatest impact on the detection results, forming a comprehensive analysis of multi-source spectrum information. The PCA classification results show that different types of sample data points cannot be completely distinguished by a straight line, indicating a certain nonlinear characteristic. The support vector machine is a generalized linear classifier for binary classification of data using supervised learning methods. SVR is a application for regression problems. For a nonlinear model, SVR uses a kernel function to map to the feature space and then performs regression. In this embodiment, the prediction model established based on SVR has better prediction performance in discriminating the lychee sample with insects and the lychee sample without insects.

Embodiment 2

The embodiment of the present disclosure discloses a non-destructive detection system for *Conopomorpha sinensis* Bradley, which includes a visible/near-infrared non-destructive detection platform, an X-ray imaging detection platform, a power supply platform, a conveyor device, and an information processing device.

The Visible/near-infrared non-destructive detection platform is used to obtain internal quality features of a lychee sample.

The X-ray imaging detection platform is used to obtain internal density variation features of the lychee sample.

The power supply platform is used to supply power to all devices and other platforms in the non-destructive detection system.

The information processing device is used to process and analyze feature information collected in the lychee system based on PLSR and a support vector machine, and obtain a detection result of the lychee sample with and without insects.

The conveyor device is compatible with the visible/near-infrared non-destructive detection platform and the X-ray imaging detection platform, and is used to convey the lychee sample to be detected to the preset detection platform for detection.

In this embodiment, in order to further verify the detection effect of the non-destructive detection system disclosed in this embodiment, comparative verification and implementation are carried out in combination with a hyperspectral imaging detection method.

Establishment of the non-destructive detection platform and preparation of experimental equipment:

Hyperspectral imaging device: FX17E, Specim company from Finland; band range: 400-1000 nm; spectral resolution: 8 nm.

Visible/near-infrared spectrometer: Ocean Optics QE pro, Ocean Optics company from USA; band range: 400-1100 nm; integration time: 500 ms.

X-ray generator: RAYON4343 type, Dongguan Rui'ao Testing Equipment Company; radiation source voltage: 100 kv; radiation source power: 15 W; focal spot size: 5 um.

It should be noted that the equipment can be chosen according to the actual applications, and the equipment of this embodiment is only used for data description and effect introduction of subsequent experimental results.

A hyperspectral imaging non-destructive detection platform includes: the hyperspectral imaging device, a black matte electric conveyor belt, an illumination system formed by eight 50 W halogen lamps and a diffuse reflective black shading wall, and a computer.

A visible/near-infrared non-destructive detection platform includes: the visible/near-infrared spectrometer, an opaque lychee fixed tray, a 10 W halogen lamp, and a computer.

An X-ray imaging device includes an X-ray generation detector, an electrically-controlled conveyor belt covered with green reflective X-ray material, and a computer.

In this embodiment, after adjustment and testing, optimal acquisition parameters for the visible/near-infrared spectrum of the lychee sample are set as follows: an integration time of 2000 ms; a receiving fiber distance of 5 mm from the lychee fixed tray; a distance of 3 mm between the lychee sample and a lampshade glass and a bulb of the halogen lamp; a light source of 10 W; the lychee sample located in a center of the lychee fixed tray, which is fixed vertically with the lychee stem facing upwards from the lychee fixed tray, and the light source, an inlet light, the lychee sample, an outlet light, and an optical fiber located on the same vertical line.

The hyperspectral image data is acquired based on the Spectronon Pro on the computer. After the hyperspectral imaging device is preheated for 15 minutes, the image of the lychee sample is acquired. In order to avoid distortion and blurring of the acquired image, multiple pre-experiments are conducted before the formal acquisition to determine the optimal data acquisition parameters: an exposure distance of the hyperspectral imaging device is 45 mm, an exposure time is 64.742 ms, a frame rate is 15 Hz, a scanning speed is 800 pps, and an image resolution of a single lychee sample is 200 pixels×200 pixels. After the hyperspectral image is acquired, the acquired image is cropped into an image containing only an area around the lychee stem that is susceptibly infected by *Conopomorpha sinensis* Bradley, with a resolution of 120 pixels×120 pixels. The acquisition process of the hyperspectral image is susceptible to the influence of dark current. An intensity distribution of the light source of the imaging system under different bands is uneven, resulting in large noise in the acquired hyperspectral image data. To eliminate the influence of the noise, blackboard and whiteboard correction is required. The correction formula for eliminating the noise is:

$$R_e = \frac{R_0 - D}{W - D}; \qquad (1)$$

Wherein, $R_e$ is corrected diffuse reflective spectral image data; $R_0$ is an original diffuse reflective spectral image data of the lychee sample; D is blackboard image data; W is whiteboard diffuse reflective image data.

The X-ray image is acquired based on the RAYON software, which is a companion software for the X-ray imaging equipment on the computer. After multiple pre-experiments, it is determined that the X-ray imaging data is collected with a X-ray tube excited by 50 kV, 192 uA, an electrically controlled conveyor belt having a speed of 2.72 m/s and staying directly below the X-ray tube for 2.8 s, and an image resolution of 3000 pixels×3000 pixels.

The lychee sample is fixed on a low-density material tray, with the stem lying parallel to the conveyor belt. The X-ray generator and the image acquisition device are placed perpendicular to the stem and the core of the lychee sample. The image of a single lychee sample is acquired, and the acquired image is processed using the Matlab software for contrast enhancement, noise reduction, sharpening, brightness adjustment, and other processing.

To further introduce and explain the above technical solutions, specific experimental data are respectively introduced for the detection results of *Conopomorpha sinensis* Bradley using the visible/near-infrared spectrum, feature spectrum of the hyperspectral imaging, and the X-ray imaging technology.

Figure 1:
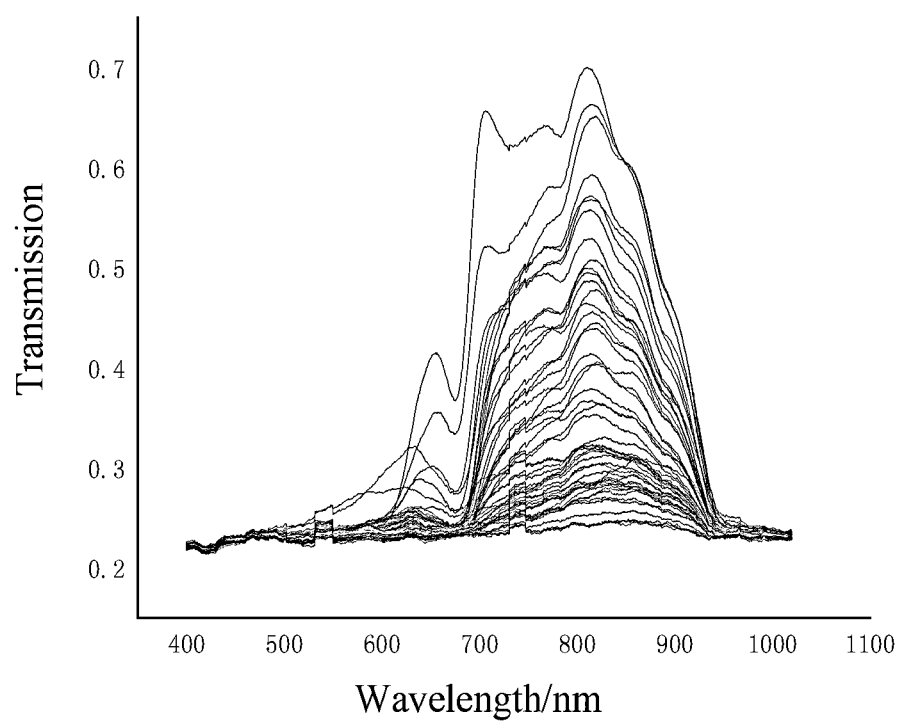
FIG. 1(a)-(b) show original spectra and PCA classification results of lychee samples acquired using visible/near-infrared technology in accordance with an embodiment of the present disclosure.
Figure 1:
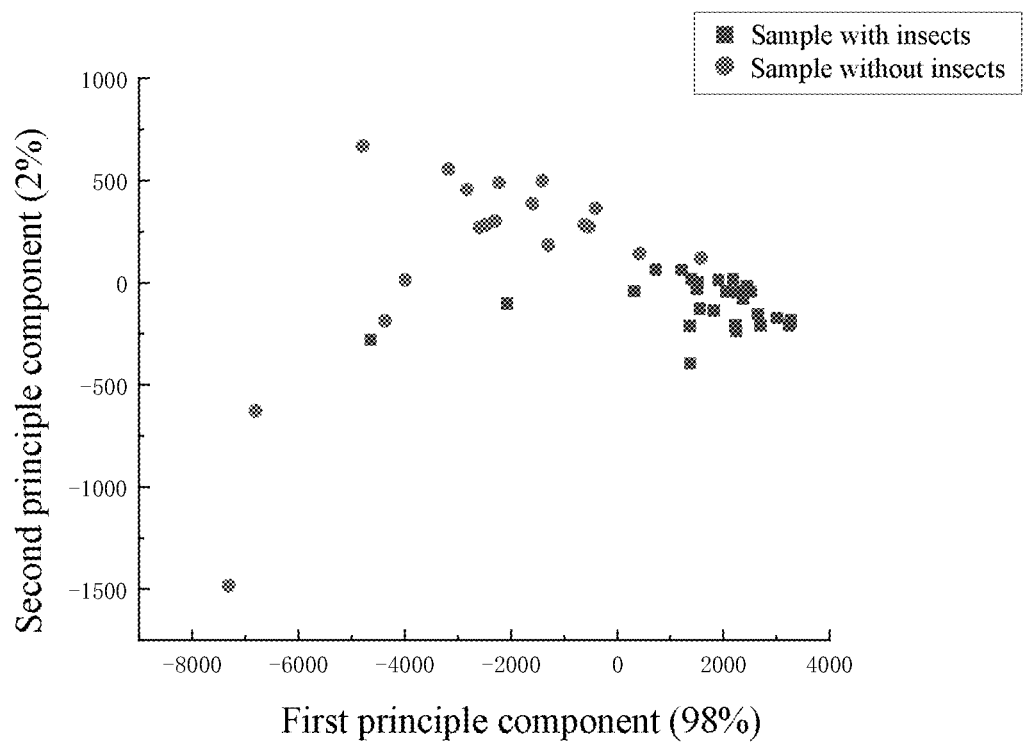
Figure 2:
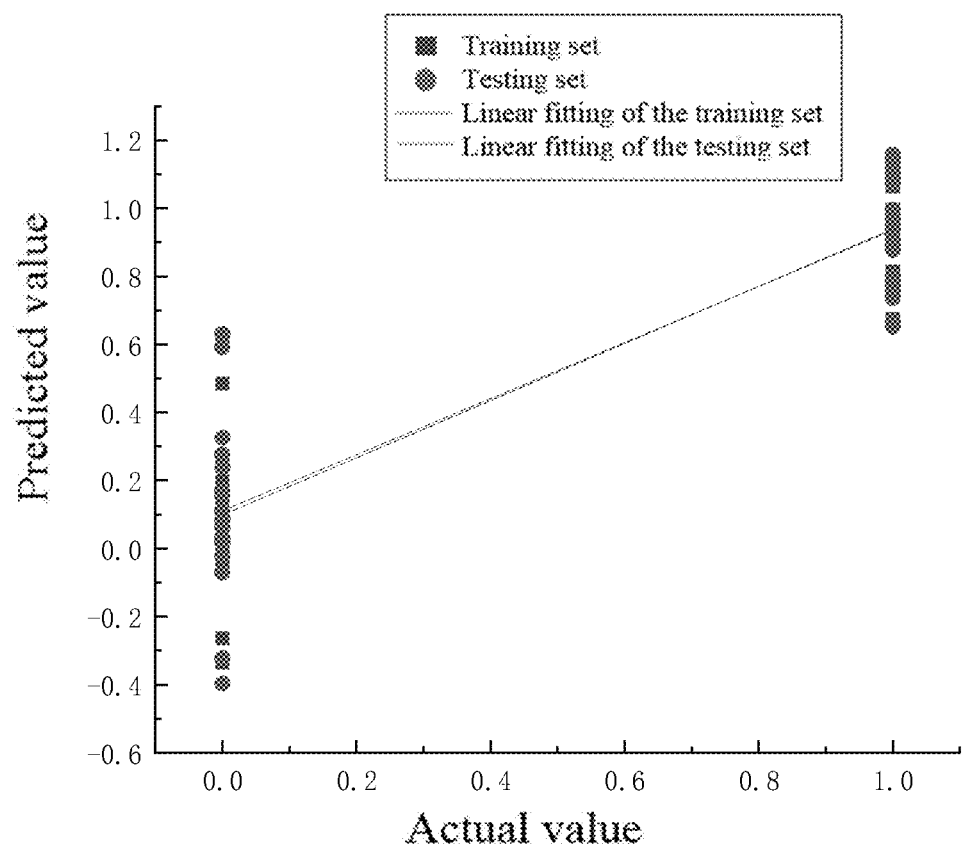
FIG. 2 shows detection results using PLSR in combination with feature bands of visible/near-infrared spectrum after feature extraction in accordance with an embodiment of the present disclosure.

Detection of *Conopomorpha sinensis* Bradley Using Visible/Near-Infrared Spectrum SPA spectral feature extraction and PCA classification are performed as follows. Original spectra of the lychee samples with wavelengths from 400 to 1100 nm are shown in FIG. 1(*a*). The data shows noise bands when the wavelength is less than 600 nm and greater than 940 nm. A SPA algorithm is used for performing feature extraction on the spectral data, and seven wavelengths are selected for a variable, namely 655.7 nm, 675.8 nm, 705.9 nm, 767.9 nm, 814.5 nm, 859.6 nm, and 894.1 nm. The PCA classification is performed based on the selected wavelengths. As shown in FIG. 1(*b*), the lychee samples with and without insects can be discriminated, however, the lychee samples are close to each other and a data dispersion of the lychee samples without insects is high, thus a clustering needs to be improved. Establishment of a PLSR model based on the feature bands of the visible/near-infrared spectrum is as follows: in order to determine the effect of the visible/near-infrared transmission spectrum in the non-destructive detection of *Conopomorpha sinensis* Bradley, PLSR is used in combination with the feature bands of the visible/near-infrared spectrum after feature extraction for detection. As shown in FIG. 2, the established PLSR model has a $R^2$ of 0.84 and a RMSE of 0.19 for the training set, and a $R^2$ of 0.80 and a RMSE of 0.21 for the testing set. A back-judgement accuracy of the feature spectrum of the training set is 90.91%, and a detection accuracy of the testing set is 87.88%.

Figure 3:
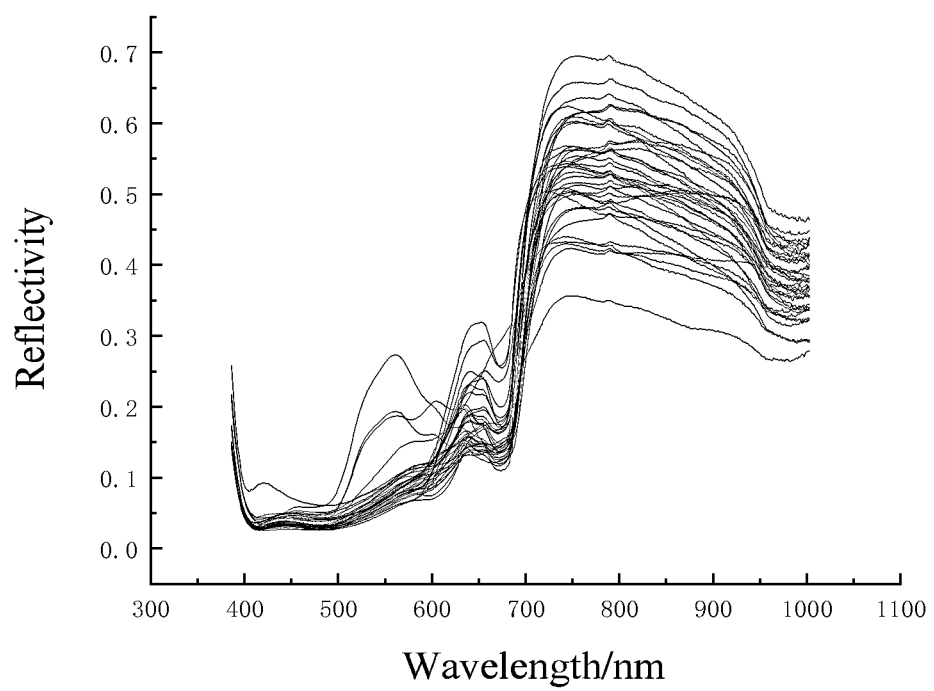
FIG. 3(a)-(b) shows original spectra and PCA classification results of the lychee samples acquired using hyperspectral imaging technology in accordance with an embodiment of the present disclosure.
Figure 3:
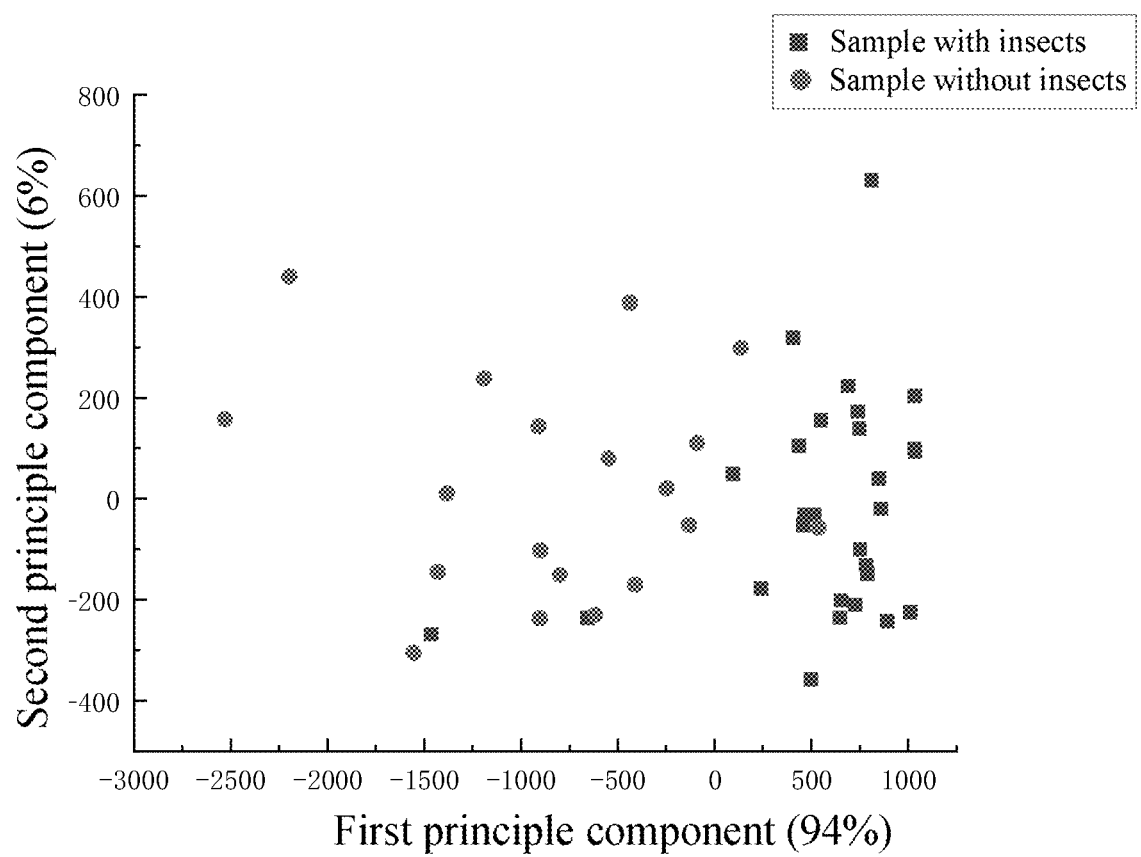

Detection of *Conopomorpha sinensis* Bradley Using Feature Spectrum of Hyperspectral Imaging SPA spectral feature extraction and PCA classification are performed as follows. The original spectra of the lychee samples with wavelengths ranging from 400 to 1000 nm are shown in FIG. 3(*a*). Some samples have slight noise fluctuations when the wavelength is less than 500 nm and greater than 950 nm. A SPA algorithm is used for performing feature extraction on the spectral data, and seven wavelengths are selected for a variable, namely 445.4 nm, 561.5 nm, 606.7 nm, 647.9 nm, 749.6 nm, 837.2 nm, and 923.9 nm. The PCA classification is performed based on the selected wavelengths. As shown in FIG. 3(*b*), although the lychee samples with and without insects can be discriminated, the lychee samples are close to each other, with a high dispersion and a general clustering.

Figure 4:
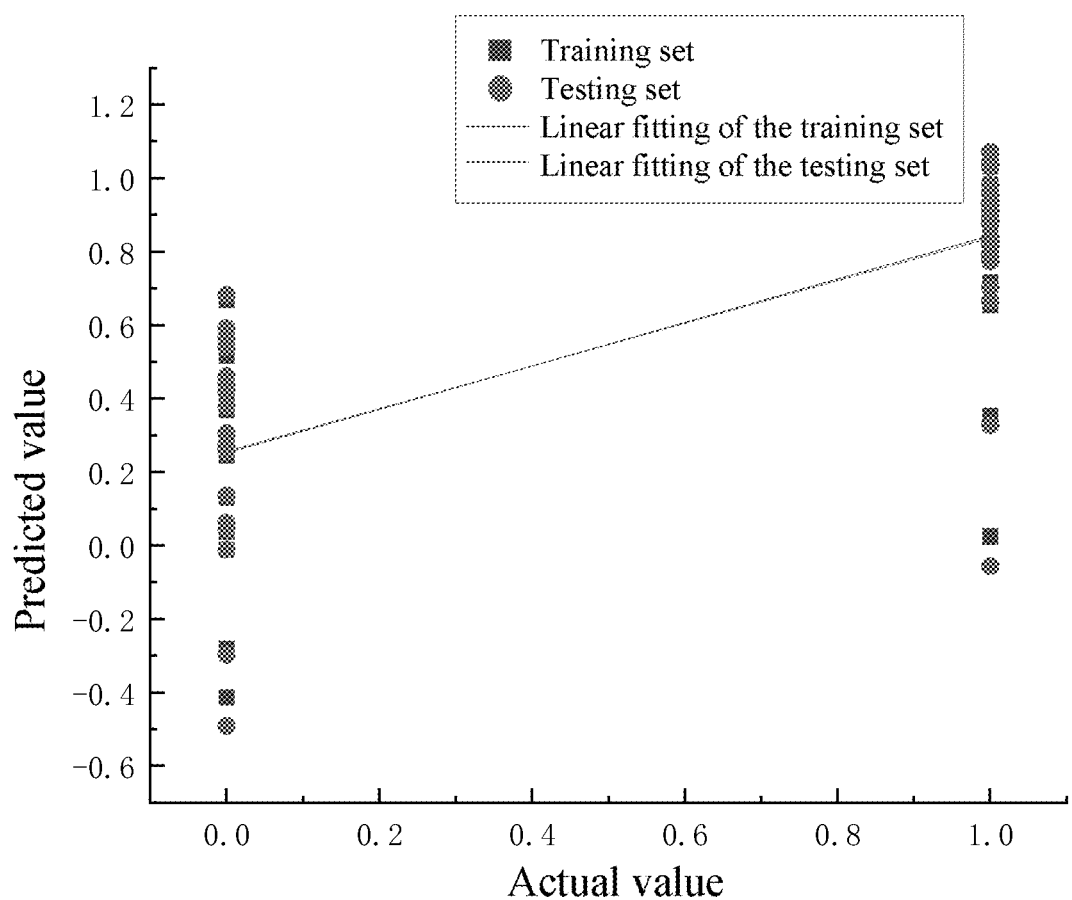
FIG. 4 shows detection results of the lychee samples using PLSR in combination with hyperspectral feature bands after feature extraction in accordance with an embodiment of the present disclosure.

Establishment of a PLSR detection model in combination with the hyperspectral imaging spectral feature bands is as follows. In order to determine the effect of the hyperspectral imaging technology in non-destructive detection of *Conopomorpha sinensis* Bradley, PLSR is used in combination with different spectral bands after feature extraction for detection. The results are shown in FIG. 4. The PLSR is used in combination with the feature spectrum of the hyperspectral image after feature extraction ranging from 400 to 1000 nm for the detection of *Conopomorpha sinensis* Bradley, and the established PLSR model has a $R^2$ of 0.61 and a RMSE of 0.30 for the training set, and a $R^2$ of 0.58 and a RMSE of 0.33 for the testing set. A back-judgement accuracy of the training set is 71%, and a detection accuracy of the testing set is 67.53%. The detection effect of the single hyperspectral imaging technology is not good. Therefore, hyperspectral data is not used in subsequent fused multi-source information.

Detection of *Conopomorpha sinensis* Bradley Using X-Ray Imaging Technology

Figure 5:
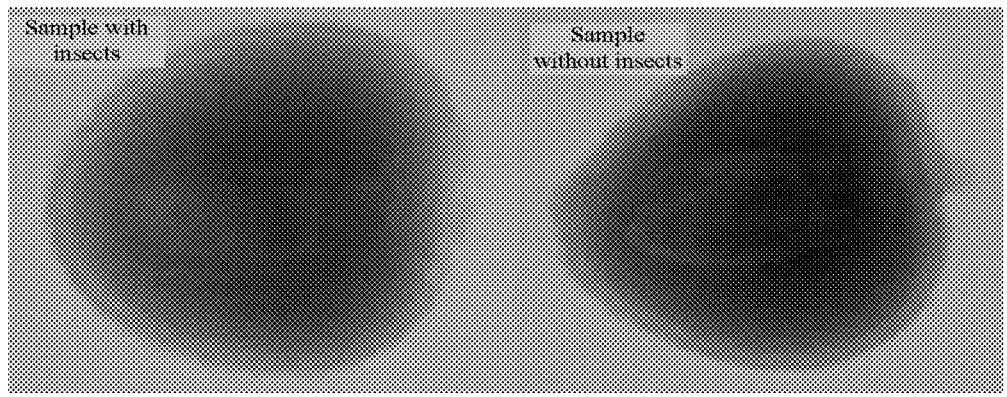
FIG. 5 shows original spectra of the lychee samples acquired using X-ray imaging technology in accordance with an embodiment of the present disclosure.
Figure 6:
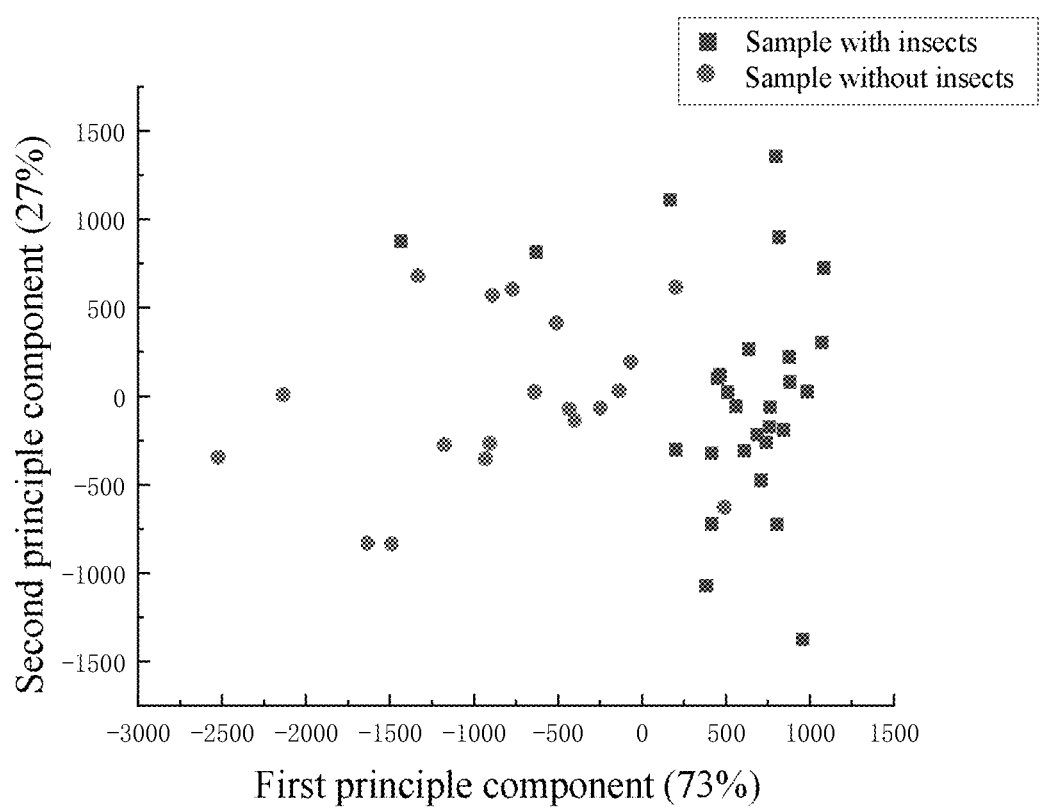
FIG. 6 shows PCA classification results of the lychee samples acquired using the X-ray imaging technology in accordance with an embodiment of the present disclosure.

SPA spectral feature extraction and PCA classification are performed as follow. The X-ray transmission image of the lychee sample is shown in FIG. 5. Due to the damage and eating of the stem of the lychee fruit by *Conopomorpha sinensis* Bradley, cavities and feces are left behind, and the light-colored area of the lychee fruit with insects is larger than the light-colored area of the lychee fruit without insects. Due to the eating by *Conopomorpha sinensis* Bradley, the cores of some lychee fruits are hollow, resulting in a low density and an irregular shape of the core. X-ray transmission image parts of the stem and the core of each lychee fruit are individually cut out from the X-ray transmission image of the lychee sample to obtain grayscale values of the stem, the core, and the flesh as well as the background grayscale value. After the grayscale values of the image area of the lychee fruit are corrected, the PCA classification is performed. As shown in FIG. 6, the results show that the lychee samples with and without insects can be discriminated, with a relatively small distance and a general clustering.

Figure 8:
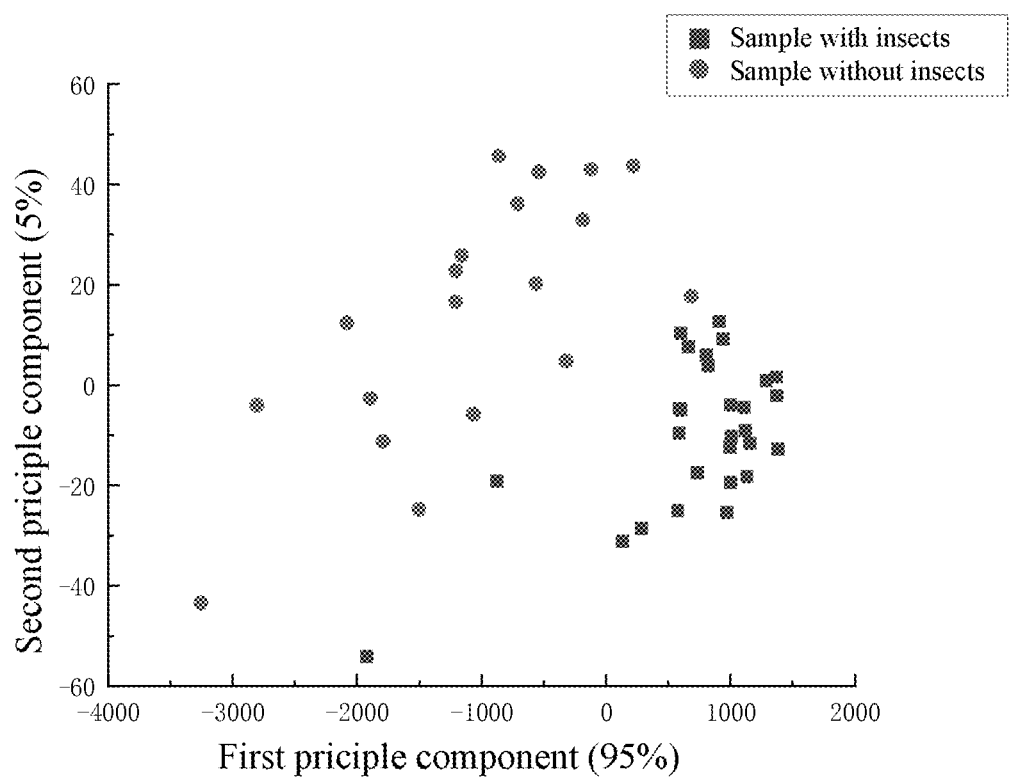
FIG. 8 shows PCA classification results of the lychee samples acquired using the visible/near-infrared technology in combination with the X-ray imaging technology in accordance with an embodiment of the present disclosure.

Detection of *Conopomorpha sinensis* Bradley Using Fused Multi-Source Information Formed by X-Ray Imaging Technology and Visible/Near-Infrared Transmission Spectrum PCA classification of fused multi-source information formed by the X-ray imaging and the visible/near-infrared transmission spectrum includes steps as follows. Analyzing the PCA classification and detection results of the PLSR model established using the X-ray imaging technology and the PCA classification and detection results using the visible/near-infrared transmission spectrum, extracting average grayscale values of the stem, the core, and the flesh in the X-ray transmission images of the lychee sample with the best classification and prediction, extracting the feature bands of the visible/near-infrared transmission spectrum using the SPA algorithm, fusing the data from the two detection methods which greatly affects the discrimination of the lychee samples to form a comprehensive analysis of multi-source information, and performing the PCA classification on the fused data. As shown in FIG. 8, the results show that lychee samples with and without insects can be discriminated, and the two types of data points are clearly distanced from each other with a good clustering.

Figure 7:
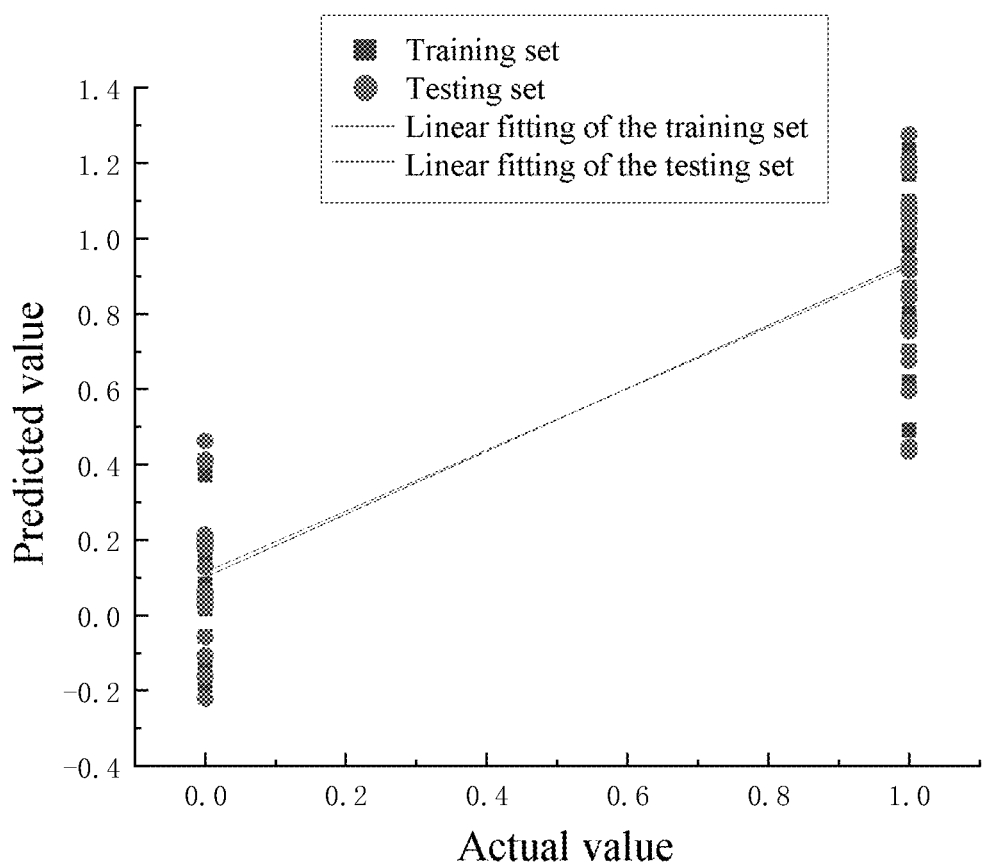
FIG. 7 shows detection results of the lychee samples using PLSR in combination with feature bands of X-ray imaging spectrum after feature extraction in accordance with an embodiment of the present disclosure.

Establishment of a PLSR model based on the X-ray imaging feature regions is as follows. In order to explore the effect of the X-ray imaging technology in the non-destructive detection of *Conopomorpha sinensis* Bradley, the result of which is shown in FIG. 7, PLSR is used to establish a model based on grayscale values of feature regions in the X-ray images for the detection of *Conopomorpha sinensis* Bradley. The established PLSR model has a $R^2$ of 0.83 and a RMSE of 0.19 for the training set, and a $R^2$ of 0.79 and a RMSE of 0.22 for the testing set. A back-judgement accuracy of the training set is 90.20%, and a detection accuracy of the testing set is 86.49%.

Figure 9:
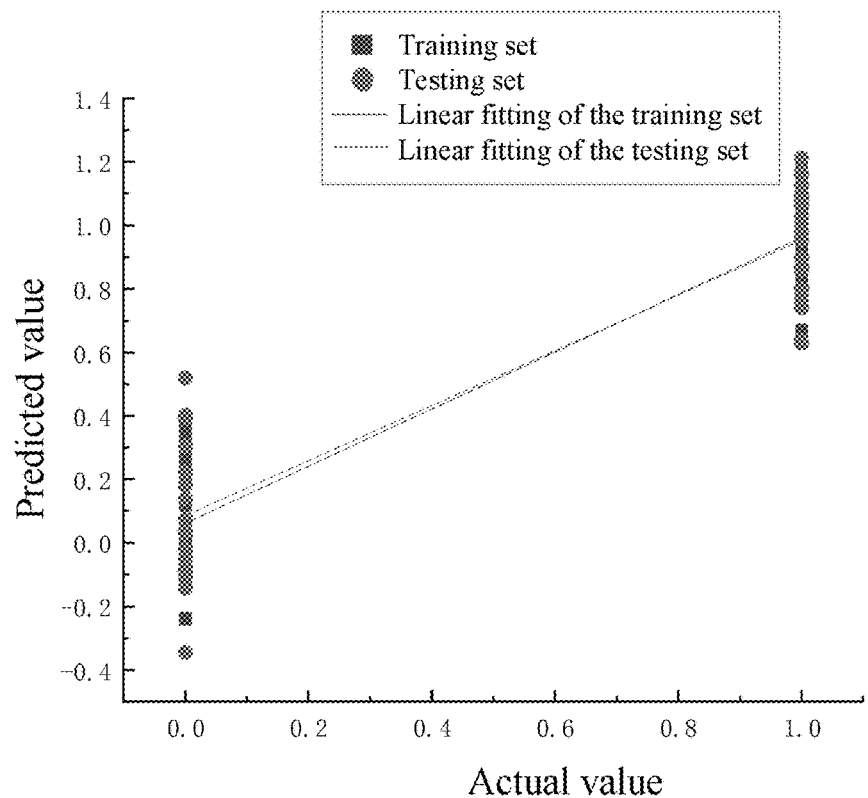
FIG. 9 shows detection results of the lychee samples using PLSR in combination with the visible/near-infrared technology and the feature bands of the X-ray imaging spectrum after feature extraction in accordance with an embodiment of the present disclosure.

Establishment of the PLSR model and a SVR model based on the fused multi-source information formed by the X-ray imaging technology and the visible/near-infrared transmission spectrum is realized as follows. In order to determine the effect of the multi-source spectral information in the non-destructive detection of *Conopomorpha sinensis* Bradley, the result of which is shown in FIG. 9, PLSR is used to establish a model based on the fused multi-source spectral information used in the detection of the lychee sample. The established PLSR model has a $R^2$ of 0.90 and a RMSE of 0.15 for the training set, and a $R^2$ of 0.85 and a RMSE of 0.19 for the testing set. A back-judgement accuracy of the training set is 96.42%, and a detection accuracy of the testing set is 92.92%.

Figure 10:
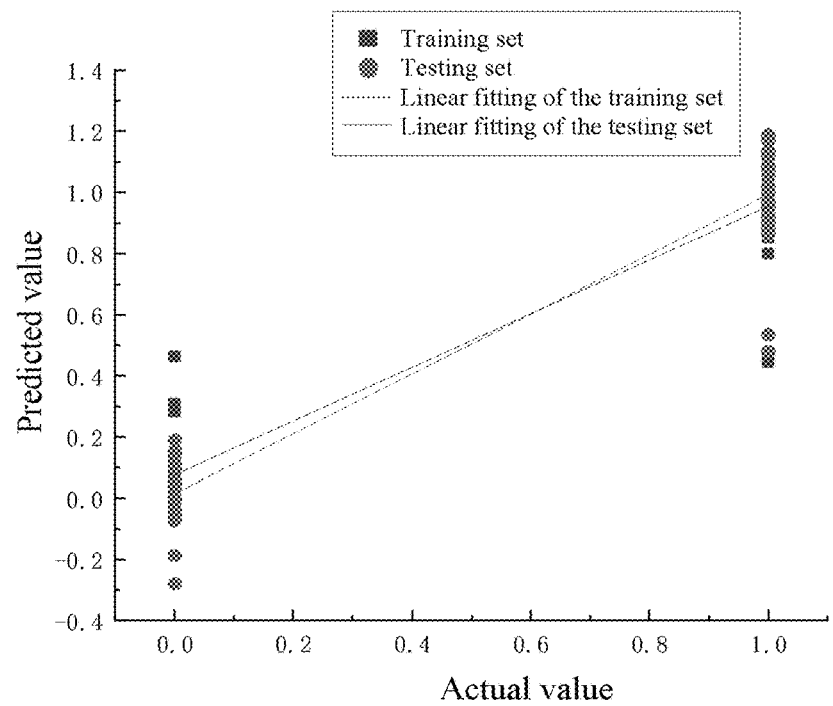
FIG. 10 is a schematic diagram showing results of a prediction model in accordance with an embodiment of the present disclosure.

In order to further improve the effect of the fused multi-source spectral information in the non-destructive detection of *Conopomorpha sinensis* Bradley, SVR is used to comprehensively analyze the visible/near-infrared transmission feature spectrum after feature extraction in combination with the grayscale values of the X-ray images. The result of the established model is shown in FIG. 10. The established SVR model has a $R^2$ of 0.89 and a RMSE of 0.15 for the training set, and a $R^2$ of 0.86 and a RMSE of 0.18 for the testing set. The results show that a back-judgement accuracy of the training set is 96.42 and a detection accuracy of the testing set is 94.44%.

The information processing device, based on the data analysis and processing program, implements feature fusion process on the received quality image representing the internal quality features of the lychee sample and the density variation image representing the internal density variation features of the lychee sample, and improves the detection accuracy in combination with PLSR and the support vector regression.

The feature fusion process on the received quality image representing the internal quality features of the lychee sample and the density variation image representing the internal density variation features of the lychee sample includes steps as follows.

Extracting the average grayscale values of the stem, the core, and the flesh in the density variation image of the lychee sample with the best classification and prediction, and combining the average grayscale values with the feature bands of the visible/near-infrared transmission spectrum extracted using the continuous projection method. The spectral data collected by the two detection platforms having the greatest impact on the discrimination effect are fused to form a comprehensive analysis of multi-source information.

The improving the detection accuracy in combination with PLSR includes steps as follows.

Preliminarily determining the classification of the lychee samples with and without insects using PCA, which is represented by a sample scatter plot formed by the first and second principal components, dividing the spectral data after feature extraction into a training set and a testing set and establishing a model to further discriminate the lychee samples with and without insects using PLSR, wherein a detection result of the lychee sample without insects is set to 0 and the detection result of the lychee sample with insects is set to 1, a detection effect of PLSR is greatly affected by the number of the selected features after dimensional reduction, and the detection result is outputted as a decimal number, usually expressed as a coefficient of determination $R^2$ between the predicted value and the actual value, as well as the root mean square error.

The improving the detection accuracy in combination with the support vector regression includes steps as follows.

Dividing the spectral data after feature extraction into a training set and a testing set and establishing a prediction model using SVR, wherein a prediction result of the lychee sample without insects is set to 0 and the prediction result of the lychee sample with insects is set to 1; rounding the results of the PLSR model and a SVR model to a nearest integer, wherein when the integer is less than or equal to 0, it indicates the lychee sample does not have insects; when the integer is greater than or equal to 1, it indicates the lychee sample has insects.

In summary, the fusion technology of the multi-source spectral information of the visible/near-infrared transmission spectrum, the hyperspectral imaging technology, and the X-ray imaging technology can be used to perform non-destructive detection, thus discriminating the lychee sample with and without insects. The technology can also be used to detect the easily-damaged peel around the stem of the lychee fruit, as well as the structure and density of the stem and the core of the lychee fruit. The obtained feature data can be used to establish a non-destructive detection model for the lychee fruit. After the PCA classification using the visible/near-infrared transmission spectrum, the PCA classification using the hyperspectral imaging feature map, the PCA classification using the visible/near-infrared transmission spectrum in combination with the hyperspectral feature map are respectively performed, it is found that although the data points on the resulting graph can roughly discriminate the lychee sample with and without insects, the data points have a high degree of dispersion and a poor clustering. In the discrimination of the lychee sample with and without insects, the detection accuracy is 87.88% when the visible/near-infrared transmission spectrum is used alone, and the detection accuracy is 86.49% when the X-ray imaging technology is used alone. By analyzing the three detection methods in different combinations, it is found that the X-ray imaging technology, which can detect the internal structure and density of the lychee fruit, can significantly enhance the clustering of data points in the PCA classification when being used in combination with the visible/near-infrared spectrum technology. However, there is still a small amount of data points of different categories of the samples is overlapped, which poses a risk of misjudgment. The PLSR model established based on the multi-source spectral information has an detection accuracy of 92.92% for the testing set. The SVR model established in combination with multi-source spectral information has a detection accuracy of 94.44% for the testing set.

After a comprehensive assessment of the effectiveness of various methods, it is determined that the SVR model established based on the visible/near-infrared transmission spectral data extracted using the SPA feature extraction in combination with the X-ray imaging data has the best result. Future research can explore new signal processing methods for the spectra to reduce the number of modeling features and simplify the model. The model established in the present disclosure is used for large-scale experimental validation of lychee, aiming to enhance the practicality and stability of the model in the future.

The embodiments in this specification are described in a progressive manner, with each embodiment focusing on the differences from other embodiments. The same and similar parts between each embodiment can be referred to each other.

It is understandable that the above-mentioned technical features may be used in any combination without limitation. The above descriptions are only the embodiments of the present disclosure, which do not limit the scope of the present disclosure. Any equivalent structure or equivalent process transformation made by using the content of the description and drawings of the present disclosure, or directly or indirectly applied to other related technologies in the same way, all fields are included in the scope of patent protection of the present disclosure.

What is claimed is:

1. A non-destructive detection method for *Conopomorpha sinensis* Bradley, comprising the following steps:
   placing a lychee sample to be detected on a conveyor belt;
   acquiring sample information of the lychee sample placed on the conveyor belt based on visible/near-infrared light and X-ray imaging technology; wherein the visible/near-infrared light is used to acquire internal quality features of the lychee sample and the X-ray imaging technology is used to acquire internal density variation features of the lychee sample;
   analyzing the sample information according to a preset data processing and analysis method based on PLSR and a support vector machine to obtain a classification result of the lychee sample with and without insects;
   the data processing and analysis method based on PLSR and the support vector machine is as follows:
   selecting effective wavelengths from full spectrum and fusing the selected effective wavelengths using a continuous projection method;
   preliminarily determining a classification of the lychee sample with and without insects using PCA, which is represented by a sample scatter plot formed by a first principle component and a second principal component;
   dividing spectral data after feature extraction into a training set and a testing set and establishing a discrimination model using PLSR, wherein a detection result of the lychee sample without insects is set to be 0 and the detection result of the lychee sample with insects is set to 1, a detection effect of a PLSR model is greatly affected by a number of the selected features after dimensional reduction, and the detection result is outputted as a decimal number, which is usually represented by a coefficient of determination $R^2$ between a predicted value and an actual value, as well as a root mean square error;
   dividing a training set and a testing set and establishing a prediction model using SVR, wherein a prediction result of the lychee sample without insects is set to be 0 and the prediction result of the lychee sample with insects is set to be 1, and rounding the results of the PLSR model and a SVR model to a nearest integer, wherein when the integer is less than or equal to 0, it indicates the lychee sample does not have insects; when the integer is greater than or equal to 1, it indicates the lychee sample has insects;
   the selecting effective wavelengths from full spectrum and fusing the selected effective wavelengths using a continuous projection method comprises:
   extracting average grayscale values of a stem, a core, and a flesh in a X-ray transmission image of the lychee sample with the best classification and prediction effect, and combining the average grayscale values with feature bands of the visible/near-infrared transmission spectrum extracted using the continuous projection method to form a comprehensive analysis of multi-source information.

2. The non-destructive detection method according to claim 1, wherein a low-density material tray is arranged on the conveyor belt for loading the lychee sample to be detected.

3. A non-destructive detection system for *Conopomorpha sinensis* Bradley, comprising a visible/near-infrared non-destructive detection platform, an X-ray imaging detection platform, a power supply platform, a conveyor device, and an information processing device;
   wherein the visible/near-infrared non-destructive detection platform is used to acquire internal quality features of the lychee sample;
   the X-ray imaging detection platform is used to acquire internal density variation features of the lychee sample;
   the power supply platform is used to supply power to all devices and platforms in the non-destructive detection system;
   the information processing device is used to perform data processing and analysis based on PLSR and a support vector machine on feature information acquired in the non-destructive detection system to acquire a detection result of the lychee sample with and without insects;
   the conveyor device is compatible with the visible/near-infrared non-destructive detection platform and the X-ray imaging detection platform, and is used to convey the lychee sample to be detected to a preset detection platform for detection;
   the information processing device implements feature fusion process on a received quality image representing the internal quality features of the lychee sample and a density variation image representing the internal density variation features of the lychee sample based on a carried data analysis and processing program, and further improves a detection accuracy in combination with PLSR and a support vector regression;
   the feature fusion process on the received quality image representing the internal quality features of the lychee sample and the density variation image representing the internal density variation features of the lychee sample comprises the following steps:
   extracting average grayscale values of a stem, a core, and flesh in the density variation image of the lychee sample with the best classification and prediction effect, and combining the average grayscale values with feature bands of visible/near-infrared transmission spectrum extracted using the continuous projection method to form a comprehensive analysis of multi-source information;
   the improves the detection accuracy in combination with PLSR comprises:
   preliminarily determining a classification of the lychee sample with and without insects using PCA, which is represented by a sample scatter plot formed by a first principal component and a second principal component;
   dividing spectral data after feature extraction into a training set and a testing set and establishing a discrimination model using PLSR, wherein a detection result of the lychee sample without insects is set to be 0 and the detection result of the lychee sample with insects is set to 1, a detection effect of a PLSR model is greatly affected by a number of the selected features after dimensional reduction, and the detection result is outputted as a decimal number, which is usually represented by a coefficient of determination $R^2$ between a predicted value and an actual value, as well as a root mean square error;
   the improves the detection accuracy in combination with the support vector regression comprises:
   dividing a training set and a testing set and establishing a prediction model using SVR, wherein a prediction result of the lychee sample without insects is set to be 0 and the prediction result of the lychee sample with insects is set to be 1, and rounding the results of the PLSR model and a SVR model to a nearest integer, wherein when the integer is less than or equal to 0, it indicates the lychee sample does not have insects; when the integer is greater than or equal to 1, it indicates the lychee sample has insects.

\* \* \* \* \*